Patented Mar. 27, 1951

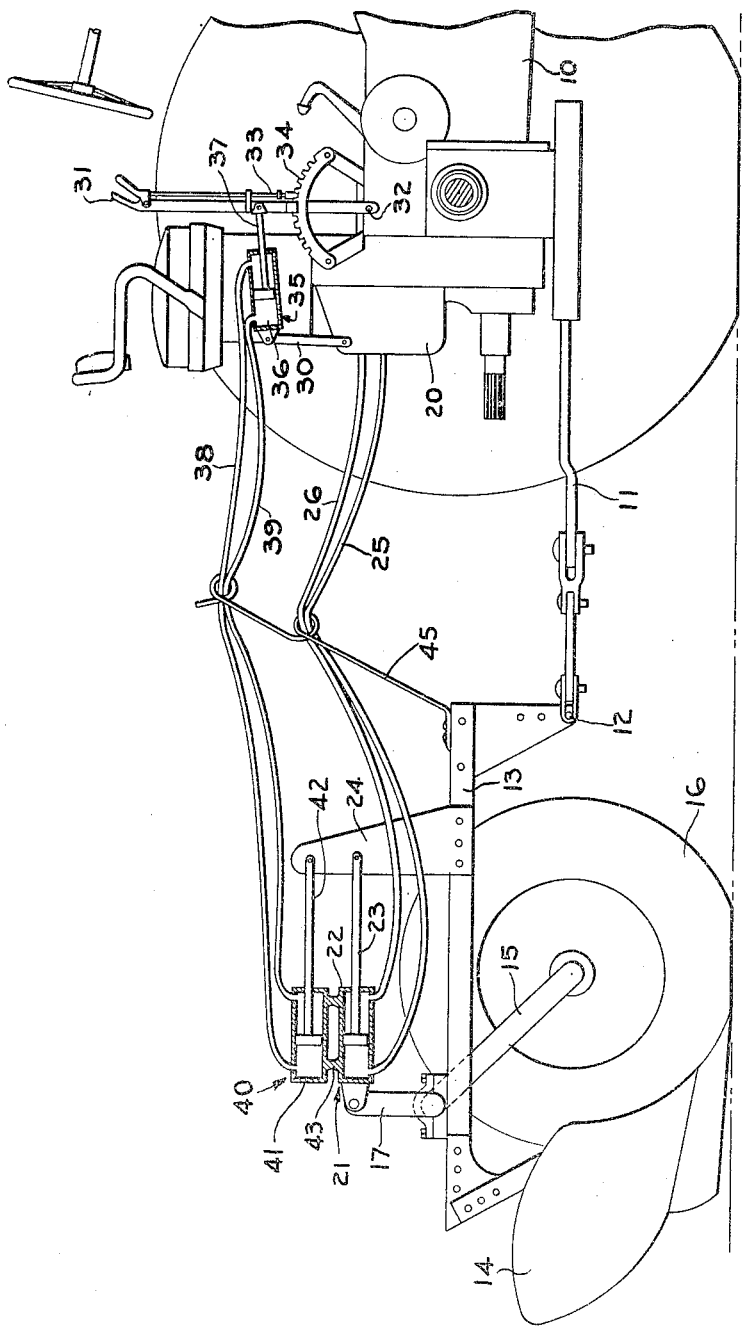

2,546,880

UNITED STATES PATENT OFFICE 2,546,880

FLUID-PRESSURE FOLLOW-UP CONTROL SYSTEM

Herman E. Altgelt, Moline, Ill., assignor to Deere & Company, Moline, Ill., a corporation of Illinois Application April 10, 1948, Serial No. 20,272

6 Claims. (Cl. 121—41)

This invention relates to a control system for operating mechanism having a pair of relatively movable parts under control of a control element, such as a valve in a hydraulic system, and the improved system has for its principal object the provision of means for automatically controlling the valve, or equivalent control element, in response to predetermined relative movement of the operating parts.

The invention finds its greatest utility in connection with hydraulic control systems as used in tractor-propelled agricultural implements and machines. In a representative type of implement or machine of the class referred to, the tractor includes a fluid pressure source for supplying fluid under pressure to a motor which is operative to adjust a part of the implement or machine. In the case of a plow, the motor is operative to raise and lower the plow bottom and the control system is so arranged that a control valve is operative to regulate the extent to which the plow is raised or lowered, thus providing means for regulating the depth at which the plow will operate.

In a system including only the fundamentals of an arrangement of the type referred to above, the depth at which the plow will operate (or the conditions under which an equivalent part will function) is determined solely by manual positioning of a control lever; that is to say, the operator moves the control lever to cause the adjustable part to be moved to a desired position, and when the part reaches such position, the operator returns the control lever to neutral. In more refined systems, the arrangement includes means for automatically returning the control lever to neutral position at such time as the adjustable part has reached its desired position.

The invention is concerned primarily with improvements in systems including automatic follow-up or feed-back means for returning control members to neutral or inactive position after the parts under control thereof have reached predetermined operating or functioning conditions. It is an important object of the present invention to accomplish this desirable result by the use of fluid pressure means. It is a further object of the invention to include fluid-pressure means of the two-way type, so that the control element or valve may be returned to its inactive or neutral position from active positions at each side of said neutral position. A still further object of the invention involves the provision of a follow-up arrangement that may be readily applied to implements or similar operating mechanisms of existing types.

The foregoing and other important objects and desirable features of the invention will become apparent to those versed in the art as the disclosure is more fully made of a preferred embodiment of the invention in the following detailed description and accompanying sheet of drawing, in which the single figure shows, by way of example, and diagrammatically, the installation of a fluid pressure follow-up system as adapted to a tractor-drawn plow.

The illustrated use of the system is based upon a preferred adaptation thereof and it should be understood that the invention is applicable to other situations and in other forms.

For the purposes of illustration and description, I have chosen a basic operating mechanism including a tractor-drawn plow comprising a tractor having a body 10 which is provided with a rearwardly extending drawbar 11 to which is pivotally connected at 12 the forward end of a plow beam 13. The numeral 14 designates a plow bottom of conventional construction. The plow beam 13 is carried on a crank axle 15 on which is journaled a carrying wheel 16. The crank axle 15 includes as an integral part thereof an upstanding lever arm portion 17. The construction thus far described is generally conventional in all respects.

The tractor may be of the type having a built-in power control mechanism including a pump or other source of fluid under pressure contained in a housing carried on the tractor, such housing being designated generally by the numeral 20. The power source is in a main fluid pressure circuit which includes a fluid pressure motor, indicated generally by the numeral 21, comprising operating members in the form of a cylinder 22 and piston 23. The cylinder is connected to the upper end of the lever arm portion 17 on the crank axle 15; and the piston is connected to a bracket or support 24 extending upwardly from and rigidly secured to the forward portion of the plow beam 13. The fluid motor 21 is preferably of the two-way type so that the piston 23 and the cylinder 22 are relatively movable in opposite directions under fluid pressure, the motor being connected by fluid-pressure transmitting means including a pair of conduits 25 and 26. The conduits 25 and 26 thus provide means for delivering fluid under pressure to opposite ends of the cylinder 22, or at opposite sides of the piston 23, the construction in this respect being not dissimilar to conventional constructions.

The power source or power control means 20 may be of any conventional type, such as illustrated in co-pending application, Serial No. 626,626, filed November 5, 1945, now Patent No. 2,532,552, by Jirsa, Hansen, and Bopp. Such power control includes a control element, here represented by the numeral 30. In the particular application of the invention illustrated, the control element 30 is capable of manual control by means of a control member or lever 31 pivoted at 32, on a support including part of the tractor, for fore and aft movement. The control lever 31 may include a releasable latch 33 cooperable with a notched sector 34 so that the lever 31 is selectively settable in various positions of adjustment.

According to the invention, the control lever 31 and control element 30 (the latter being connected to suitable valve control means within the housing 20) are interconnected by means in the form of a device providing for either movement of the parts 31 and 30 together, or for movement relative to each other in opposite directions. The interconnecting means preferably takes the form of a two-way fluid pressure device designated generally by the numeral 35 and comprises a cylinder 36 and piston 37. The cylinder and piston provide members that are connectible together for movement simultaneously and that are further disconnectible from each other for movement separately, according to variations in fluid pressure impressed thereon or exhausted therefrom, the means for accomplishing which will be presently described.

The fluid pressure device 35 is connected by a pair of fluid-pressure-transmitting means 38 and 39 to a second fluid-pressure-transmitting device 40 carried on the plow. With respect to the location of the fluid-pressure device 40, it should be stated that it is not absolutely necessary that this device be mounted on the plow, for various other installations thereof are possible, the important requirement being only that the device 40 be so related to the device 21 as to respond to operation thereof. The fluid-pressure device 40 is of the two-way type and comprises a cylinder 41 and piston 42. The piston 42 is connected to an integral upward extension of the bracket or support 24 previously described. The cylinder 41 is preferably connected to the cylinder 22 of the motor 21, as at 43. In a detailed construction of the type disclosed, the piston 42 is, in effect, connected to the piston 23 of the motor 21, whereas the cylinder 41 is connected to the cylinder 22 of the motor 21. It will be obvious that the cylinder and piston 41 and 42 may be connected to movable parts operated or adjusted by the motor 21. The type of construction illustrated is convenient for the purposes of illustration.

The fluid-pressure-transmitting means or conduits 38 and 39 serve to connect opposite ends or sides of the cylinder 41 in fluid-exchanging relationship respectively with opposite sides of the cylinder 36 of the fluid-pressure device 35. Although the means 38 and 39 are here shown as hoses, it will be obvious that they may assume any other form. These hoses are appropriately supported intermediate their connections to the cylinders 36 and 41 by a support 45 carried at the forward end of the plow beam 13. Likewise, intermediate portions of the hoses 25 and 26 are so carried.

The operation of the system is as follows: The parts are shown in the drawings in their intermediate positions. The piston 37 is midway between the opposite ends of the cylinder 36; the piston 23 is midway between opposite ends of the cylinder 22; and the piston 42 is midway between opposite ends of the cylinder 41. In connection with the functioning and structure of the fluid-pressure devices 35 and 40, it will be noted that the fluid pressure circuit between these two devices is entirely independent of or separate from the fluid-pressure circuit between the power source 20 and the motor 21. As a matter of fact, the fluid-pressure circuit including the elements 35, 38, 39 and 40 will be found useful in connection with the control of mechanical or other systems as distinguished from the hydraulic system including the components 20, 25, 26 and 21. Therefore, the illustration of the invention in connection with the last mentioned type of hydraulic system should not be taken to limit the invention to the controlling of hydraulic systems alone.

It will be assumed that the operator desires to raise the plow bottom 14, in which case the system will be operated so that the crank axle 15 is rocked in a clockwise direction on its bearing on the plow beam 13. Accordingly, the operator releases the latch 33 on the control lever 31 and moves the lever to the left, the distance of movement depending upon how high the operator desires to raise the plow bottom 14. Having selected the desired amount of movement, the operator releases the latch 33 and the control lever 31 will become set in a different angular position with respect to the quadrant 34. The component parts of all the fluid-pressure devices 21, 35, and 40 will be static. Therefore, fluid or fluid pressure at opposite sides of the piston 37 in the chamber provided by the cylinder 36 of the device 35 will be balanced or held by the static relationship between the piston 42 in the chamber provided by the cylinder 41 of the device 40. Consequently, the fluid-pressure device 35 has its component parts interconnected in such manner that the device serves as a rigid link between the lever 31 and the valve control element 30, whereupon movement of the lever 31 to the left will simultaneously effect movement of the control element 30 to the left. The valve (not shown) controlled by the element 30 will thus condition the power source to deliver fluid through the conduit 26 to the right hand end of the cylinder 22 of the fluid motor 21, causing relative movement of the piston 23 and cylinder 22 such as to contract the motor 21 and shorten the distance between the lever arm 17 and support 24, fluid being exhausted from the left hand end of the motor through the lower hose or conduit 25 back to the reservoir (not shown) of the fluid pressure system, as is usual.

Contracting of the motor 21 effects a similar contracting of the fluid-pressure device 40, thus causing relative movement of the piston 42 and the cylinder 41, whereupon the fluid-pressure device 40 serves as a pump for transmitting the effects of fluid pressure through the upper hose or conduit 38 to the right hand end of the chamber provided by the chamber 36 of the fluid-pressure device 35. The device 35 thus functions as a fluid-pressure motor and the piston 37 and cylinder 36 move relatively, thus contracting the distance between the lever 31 and the control element 30, whereupon the latter is moved to the right, or returned to its inactive or neutral position. Such action of the control element 30 returns the control valve for the power source 20 to neutral position and the transmission of fluid under pressure to the motor 21 is discontinued, whereupon all the parts regain their static positions. Since the control lever 31 is set by the latch 33, it will remain in its leftward position. Now, assuming that the operator has not moved the lever 31 to its maximum leftward position, he may shift the lever further to the left and raise the plow bottom 14 an increased amount, whereupon the control system will follow the procedure set forth above.

Conversely, if the operator desires to lower the plow bottom, he will move the control lever 31 to the right, after first releasing the latch 33. Since all the parts start in their static position, the fluid-pressure motor 35 effects a rigid link between the lever 31 and control element 30, whereupon the control element 30 follows the lever 31 to the right. Thereupon, fluid pressure is transmitted through the lower fluid-pressure-transmitting conduit 25 to the left hand end of the cylinder 22 of the motor 21, thereby extending the motor 21 and rocking the crank axle 15 in a counterclockwise direction. Extension of the motor 21 effects a similar extension of the device 40, which now operates as a fluid-pressure pump in the other direction to supply fluid under pressure through the means 39 to the left hand end of the device 35, fluid being exhausted from the right hand end of the device 35 through the conduit 38 back to the left hand end of the cylinder 41. Consequently, after the plow bottom 14 has been lowered to an extent consistent with the extent of angular positioning of the lever 31, the control element 30 will be moved to the left, or returned to its neutral or inactive position.

From the foregoing description, it will be seen that the control system is both flexible and efficient and may be used with precision to effect adjustment of the implement or machine part, here represented by the plow bottom 14. Other objects and advantages of the invention will undoubtedly occur to those versed in the art, and it is not intended that the precise details of construction and the description based thereon exclude other adaptations of the invention, for it is obvious that numerous modifications and alterations may be made in the preferred form of the invention illustrated without departing from the spirit and scope of the invention as defined in the appended claims.

I claim:

1. In a system of the class described including parts relatively movable in opposite directions from one static position to other static positions and operating means for rendering said parts static or relatively movable including a control element movable in either direction from an inactive position to active positions and return for controlling the operating means, the improvement residing in mechanism for moving the control element from its inactive position to an active position and for automatically returning said element to inactive position after predetermined relative movement of said parts, comprising: a control member selectively settable in different positions; a first two-way fluid-pressure device, including a piston and a cylinder connected respectively to the aforesaid parts; a second two-way fluid-pressure device including a cylinder and piston, one connected to the control member and the other to the control element; a first fluid-pressure-transmitting conduit connecting one side of the first cylinder with the one side of the second cylinder; and a second fluid-pressure-transmitting means connecting the other side of the first cylinder to the other side of the second cylinder; said fluid-pressure devices being inactive when the aforesaid parts are static so that the second device operates as a rigid link between the control member and the control element to provide for moving of the latter by the former in either direction, relative movement of the cylinder and piston in the first fluid-pressure device effectuating fluid pressure exchange with the second fluid-pressure device to move the second piston and cylinder relative to each other and hence to move the control element relative to the control member.

2. In a system of the class described including parts relatively movable in opposite directions from one static position to other static positions and operating means for rendering said parts static or relatively movable including a control element movable in either direction from an inactive position to active positions and return for controlling the operating means, the improvement residing in mechanism for moving the control element from its inactive position to an active position and for automatically returning said element to inactive position after predetermined relative movement of said parts, comprising: a control member selectively settable in different positions; a first two-way fluid-pressure device comprising a pump connected to at least one of the aforesaid parts and capable of discharging or receiving fluid alternately at either side thereof depending upon the direction of relative movement of said parts; a second two-way fluid-pressure device comprising a motor having a pair of members movable relative to each other in opposite directions and connected respectively to the control member and to the control element, one of said motor members including a chamber enclosing the other motor member and capable of receiving or discharging fluid at either side of said other motor member; and first and second fluid-pressure-transmitting means connected respectively between opposite sides of said devices; said fluid-pressure devices being inactive when the aforesaid parts are static so that the second device operates as a rigid link between the control member and the control element to provide for moving of the latter by the former in either direction; operation of the first device as a pump to discharge fluid pressure at one side or the other thereof in response to relative movement of the aforesaid parts in one direction or the other effectuating the transmission of fluid-pressure to one side or the other of the second device to move the members thereof relative to each other in one direction or the other and hence to move the control element relative to the control member in one direction or the other.

3. In a system of the class described including parts relatively movable in opposite directions from one static position to other static positions and operating means for rendering said parts static or relatively movable including a control element movable in either direction from an inactive position to active positions and return for controlling the operating means, the improvement residing in mechanism for moving the control element from its inactive position to an active position and for automatically returning said element to inactive position after predetermined relative movement of said parts, comprising: a control member selectively settable in different positions; a fluid-pressure means including a two-way cylinder and piston device connected between the control member and the control element; means connected to at least one of the aforesaid parts and operative in response to a static condition of said parts to hold fluid pressure in said cylinder on both sides of said piston so that said device serves as a rigid link between the control member and the control element providing for movement of the latter by the former in either direction to an active position; and means connected to at least one of said parts and operative respectively in response to relative movement of said parts in one direction or the other to impress and exhaust fluid-pressure on one side or the other of said piston to move the control element relative to the control member.

4. In a system of the class described including parts relatively movable in opposite directions from one static position to other static positions and operating means for rendering said parts static or relatively movable including a control element movable in either direction from an inactive position to active positions and return for controlling the operating means, the improvement residing in mechanism for moving the control element from its inactive position to an active position and for automatically returning said element to inactive position after predetermined relative movement of said parts, comprising: a control member selectively settable in different positions; a two-way fluid-pressure device having a pair of members movable relative to each other in opposite directions for expansion or contraction and connected respectively to the control member and to the control element, one of said members being a fluid-receiving and -exhausting chamber and the other being carried therein, said chamber including a port at each side of said other member for receiving or exhausting fluid pressure; means connected to at least one of the aforesaid parts and operative in response to a static condition of said parts to hold a fluid-pressure balance on both of said parts so that said device serves as a rigid link between the control member and the control element providing for movement of the latter by the former in either direction to an active position; and means connected to at least one of said parts and operative respectively in response to movement of said parts relative to each other in one direction or the other to impress and exhaust fluid-pressure on one side or the other of said member in the chamber through one or the other of said ports to expand or contract said device and thus to move the control element in one direction or the other relative to the control member.

5. In a system of the class described including parts relatively movable in opposite directions from one static position to other static positions and operating means for rendering said parts static or relatively movable including a control element movable in either direction from an inactive position to active positions and return for controlling the operating means, the improvement residing in mechanism for moving the control element from its inactive position to an active position and for automatically returning said element to inactive position after predetermined relative movement of said parts, comprising: a control member selectively settable in different positions; an interconnecting device between the control member and the control element including a pair of members interconnectible for movement together to serve as a rigid link means between the control member and control element so that the former may move the latter in either direction from inactive position, said pair of members being disconnectible for movement relative to each other in opposite directions so that the control element may return to inactive position from either direction relative to the control member; and means including a two-way fluid-pressure device connected to at least one of the aforesaid parts and to the interconnecting device and operative in response to a static condition of said parts to hold said pair of members in interconnected relation, and operative in response to relative movement of said parts in one direction or the other to effect disconnection of said pair of members and to move one of said members relative to the other in one direction or the other.

6. In a system of the class described including parts relatively movable in opposite directions from one static position to other static positions and operating means for rendering said parts static or relatively movable including a control element movable in either direction from an inactive position to active positions and return for controlling the operating means, the improvement residing in mechanism for moving the control element from its inactive position to an active position and for automatically returning said element to inactive position after predetermined relative movement of said parts, comprising: a control member selectively settable in different positions; operating means between the control member and control element operative to condition the two for movement together in either direction when the aforesaid parts are in a static condition, and operative to condition the control element for return movement from either direction to inactive position relative to the control member; and means including a two-way fluid-pressure device connected to one of the aforesaid parts and to the control element and operative in response to relative movement of said parts in one direction or the other to return the control element to inactive position from one direction or the other relative to the control member.

HERMAN E. ALTGELT.

No references cited.